United States Patent [19]

Dreyfuss et al.

[11] Patent Number: 4,772,198
[45] Date of Patent: Sep. 20, 1988

[54] APPARATUS FOR INJECTION-MOLDING THREADED PLASTIC CAPS AND STOPPERS

[75] Inventors: Wilfried Dreyfuss, Dorfstrasse 52, D-3111 Eimke, Fed. Rep. of Germany; Thomas E. Remp, 5555 Del Monte Dr., Houston, Tex. 77056; Kurt Müller, Eicklingen, Fed. Rep. of Germany

[73] Assignees: Wilfried Dreyfuss, Eimke, Fed. Rep. of Germany; Thomas E. Remp, Houston, Tex.

[21] Appl. No.: 909,635

[22] Filed: Sep. 22, 1986

[30] Foreign Application Priority Data

Sep. 21, 1985 [DE] Fed. Rep. of Germany ....... 3533722

[51] Int. Cl.$^4$ ............................................. B29C 33/44
[52] U.S. Cl. .................................... 425/351; 425/422; 425/438
[58] Field of Search .................... 425/351, 422, 438

[56] References Cited

U.S. PATENT DOCUMENTS

| | | | |
|---|---|---|---|
| 2,226,326 | 12/1940 | Scott | 425/438 |
| 2,285,297 | 6/1962 | McGinnis | 425/438 |
| 2,317,823 | 4/1943 | Strauss | 425/422 |
| 2,404,631 | 7/1946 | Gronemeyer | 425/438 |
| 2,408,630 | 10/1946 | Green | 425/438 |
| 2,513,216 | 6/1950 | Sullivan et al. | 425/422 |
| 3,006,030 | 10/1961 | Paull | 425/422 |
| 3,247,548 | 4/1966 | Fields et al. | 425/438 |
| 3,587,144 | 6/1971 | Mechling | 425/422 |
| 3,726,626 | 4/1973 | Bromberg | 425/351 |
| 4,155,698 | 5/1979 | Aichinger | 425/438 |
| 4,157,887 | 6/1979 | Sothje | 425/422 |

FOREIGN PATENT DOCUMENTS 448616 5/1948 United Kingdom ............... 425/422

*Primary Examiner*—Tim Miles
*Attorney, Agent, or Firm*—Shlesinger, Arkwright & Garvey

[57] ABSTRACT

In injection-molding threaded molded articles in the form of plastic caps and stoppers with or without imbedded reinforcing cages, an injection unit, a closing unit and an injection mold are provided, where the movable mold half is equipped with a threading part. The threading part is irrotational and integral. A rotating tool is provided, which for the condition of open injection mold can be moved between the mold halves and is operationally linked to the molded article so it can be jointly moved with it to unscrew the molded article from the threading part. Radial and axial centering pins are provided in the injection mold to center the cage.

12 Claims, 4 Drawing Sheets

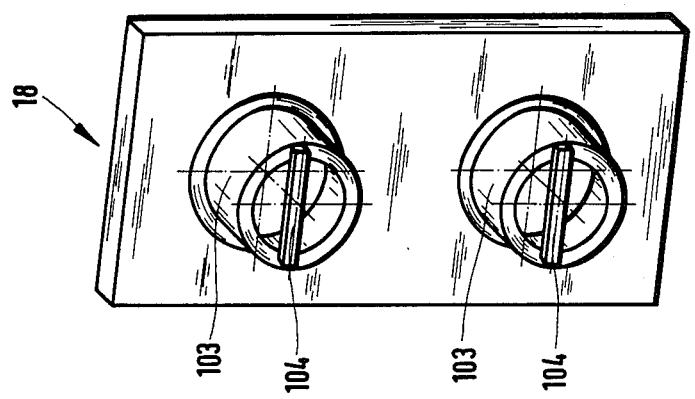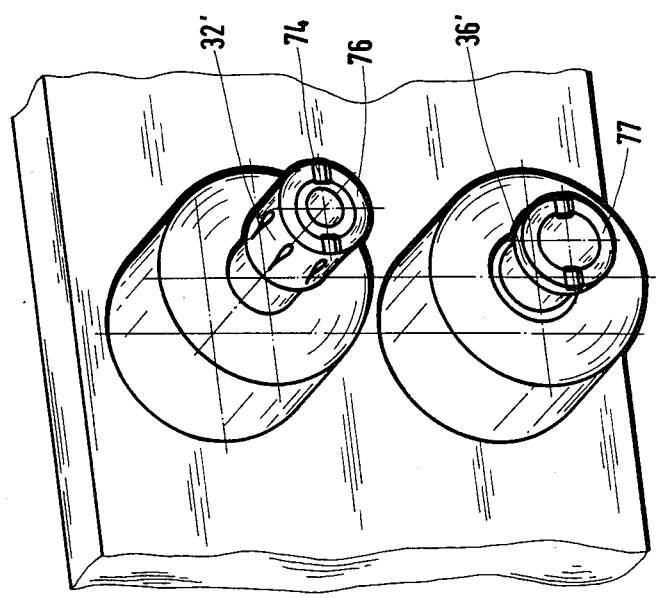
FIG. 4

APPARATUS FOR INJECTION-MOLDING THREADED PLASTIC CAPS AND STOPPERS

Injection-molding apparatus are known which are provided with folding cores and laterial sliders moving inward toward the mold center for the shaping and ejection of the inner thread of the cap and which are provided with so-called split molds and lateral, outwardly moving sliders for the shaping of the outer threads of the stopper. It is known furthermore as regards manufacuring caps with inside threads to eject, or to remove from the spindle the inside thread, by using a rotatably supported threading core. On an industrial scale, the use of a folding core is complex and costly. Each core that allows unscrewing requires its own unscrewing device bound to the machine. The core must be unscrewed toward the rear from the molded part (cap) and accordingly the mold must be comparatively elongated. Such a device also is quite expensive. Moreover, where injection molding apparatus with side sliders or split molds are used to make caps, it is impossible to suitable center the imbedded reinforcing cages.

Accordingly the object of the present invention is to so design the process and apparatus of the initially cited kinds that the shaping and ejection of the threaded stoppers and caps with or without reinforcing cages can be achieved with simpler and multi-use molds.

The solution of the invention creates a simple, economically manufactured injection mold together with an ejection tool to unscrew the caps and stoppers, and this tool no longer is bound to the machine and can be used in manifold applications. The injection mold itself may be made shorter overall and therefore is more compact. The process and apparatus of the invention are especially economical for small runs.

The invention is discussed more comprehensively below in relation to the attached drawings showing an illustrative embodiment.

FIG. 4 is a schematic of an ejection or unscrewing device to be used in the apparatus of FIG. 1.

Figure 1:
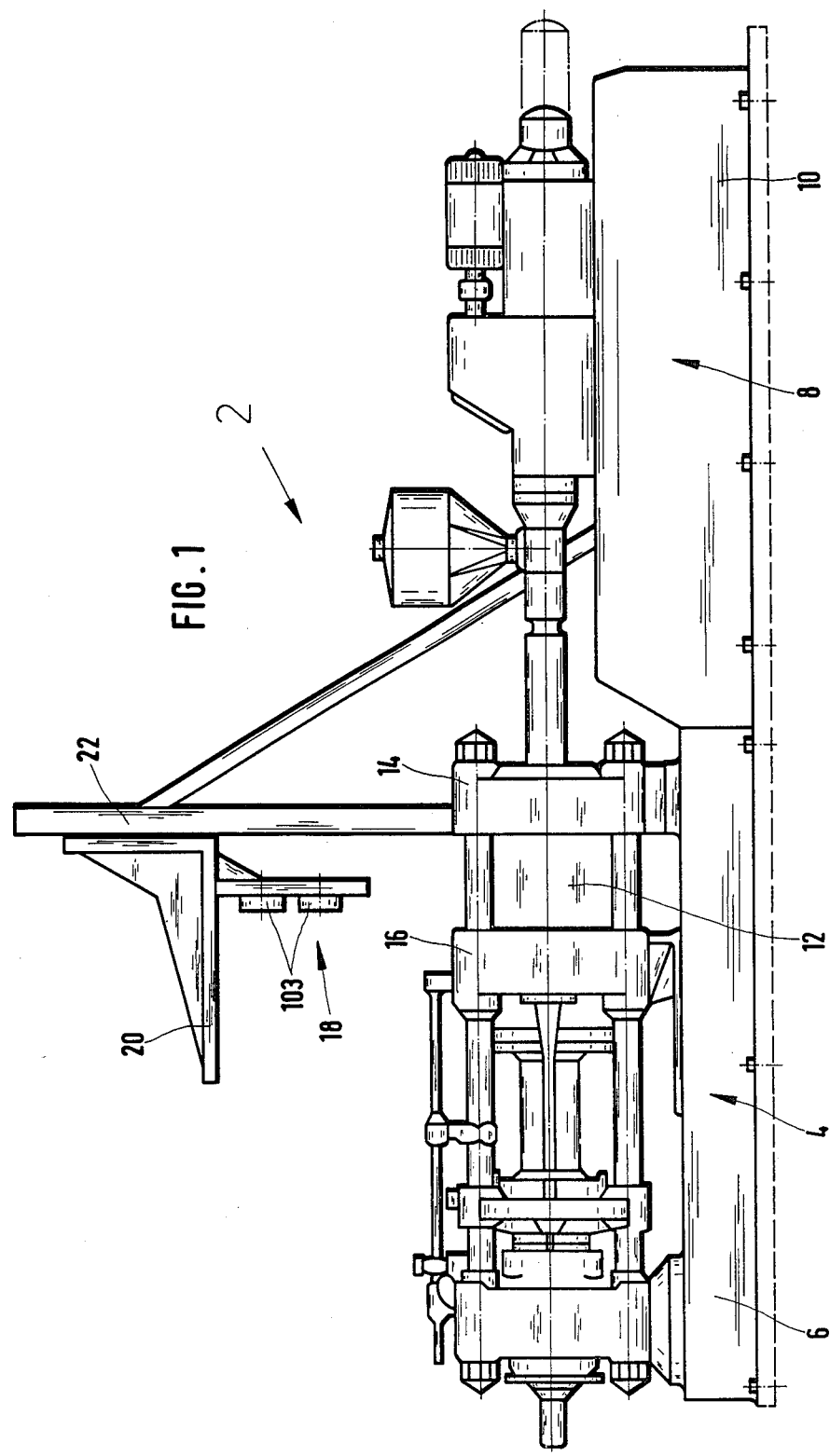
FIG. 1 is a schematic sideview fo an injection-molding apparatus of the present invention.

FIG. 1 shows an injection-molding apparatus 2 with a closing unit 4 on a base plate 6 and with an injection part 8 on a base plate 10. An injection mold 12 is mounted upon the plates 14 and 16 of the closing unit 4. The plate 14 is fixed, while the plate 16 is displaceable.

Furthermore, the injection-molding apparatus 2 is equipped with an ejection or unscrewing tool 18 mounted on a support arm 20 movable up-and-down along a frame 22. On completion of the molding process and after the injection mold has been opened, the ejection tool 18 dips into the space between the parts of the injection mold, and approaches the molded article which it then rotates out of the mold.

Figure 2:
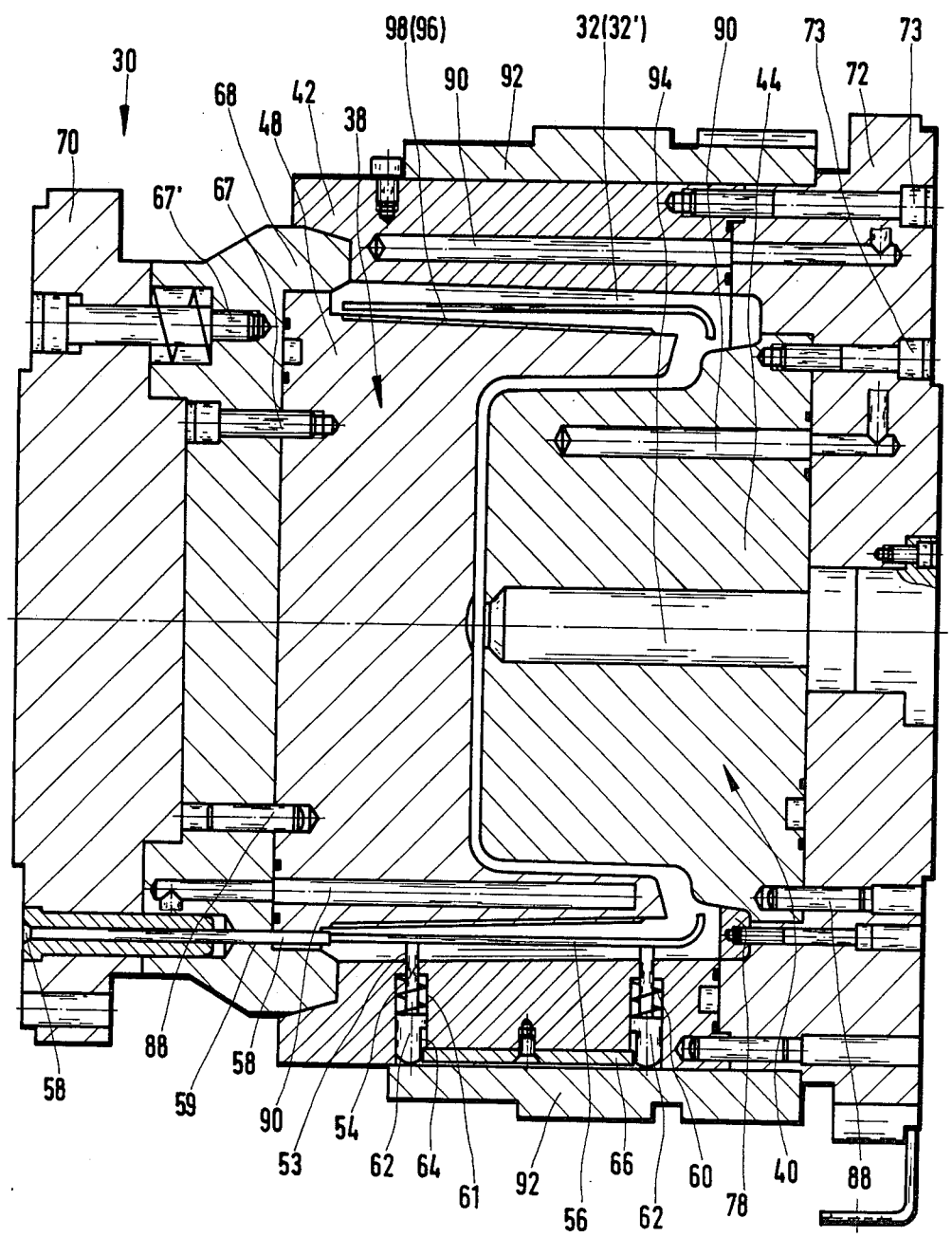
FIG. 2 is an injection mold used in the apparatus of FIG. 1 to manufacture a cap provided with an inside thread and an imbedded cage.
Figure 3:
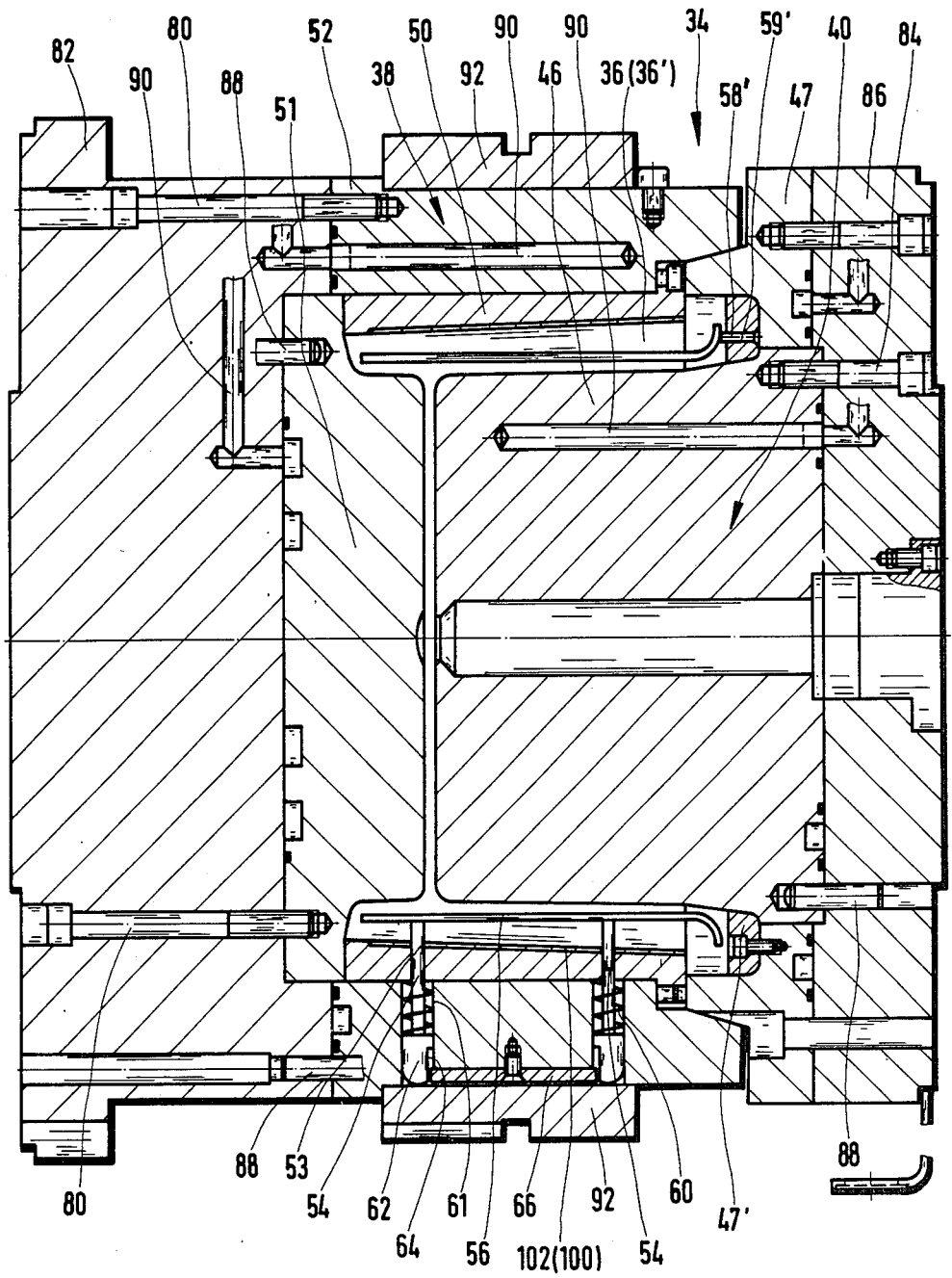
FIG. 3 is an injection mold used in the apparatus of FIG. 1 to manufacture a stopper provided with an inside thread and an imbedded cage.

FIG. 2 shows an injection mold 30 to manufacture a cap 32' and FIG. 3 shows an injection mold 34 to manufacture a stopper 36'. The same or comparable components of the injection molds are denoted by the same references.

The mold halves of the injection molds 30 and 34 are resp. denoted by the movable one, 38, and by the fixed one, 40.

The fixed mold half 40 of the mold 30 consists of a mold cavity member 42 and lifting core 44 and in the mold 34 consists of a shaping core 46 and a head plate 47. The movable mold half 38 of mold 30 consists of a threading core 48 and in the mold 34 of a threading sleeve 50 with a base plate 51 and a mold bushing 52.

The fixed mold half 40 of the mold 30 comprises the shaping nest or mold cavity member 42, and furthermore the movable half 38 of the mold 34 comprises mold busing radial centering pins 54 located in radial boreholes 53 to center radial centering pins spaced apart axially and peripherally in order to radially center a preferably metallic cage 56 to be imbedded. The radial centering pins 54 are radially prestressed outwardly by compression springs 60 resting on the bottom of an external widening of the boreholes 53 and against head 62 of the centering pins 54. The head 62 includes a lateral clearance 64. The radial centering pins are prevented from dropping out be retaining plates 66 externally screwed onto the mold cavity 42 and entering the borehole widening 61 and the clearance 64.

The cage 56 is centered axially be axial centering pins 58, which are seated in the mold 30 in boreholes 59 of the threading core 48 (FIG. 2) and in the mold 34 the pins 58' are seated (FIG. 3) in boreholes 59' in parts 47' of the head plate 47. The axial centering pins 58 pass axially outward through a centering plate 68 connected by means of screws 67 to the threading core 48 and through a base plate 70 which is screw-tightened (screws 67') with the centering plate relative to which this base plate 70 may move axially by a given amount, and this base plate 70 can be attached to the movable plate of the closing unit 4.

The mold cavity member 42 and the lifting core 44 each are screw-tightened (screws 73) to a common head plate 72 which can be mounted on the fixed plate 14 of the closing unit 4.

In order to shape a diagonal groove 74 (FIG. 4) in the end wall 76 of the cap 32' and to apply a tool, the fixed mold 40 is provided with at least two diagonal inserts 78. The parts 47' of the head plate 47 also are inserts to form a diagonal groove 74' in the end wall 77 of the stopper 36.

In the mold 34 (FIG. 3), the threading sleeve 50 with the base plate 51 and the mold bushing 52 can be screw-tightened by means of screws 80 to a common base plate 82 which can be mounted to the movable plate 16 of the closing unit 4; the shaping core 46 and the head plate 47 are mounted by means of screws 84 to a common flange plate 86 which can be mounted to the fixed plate 14 of the closing unit 4.

The molds 30 and 34 are provided with several cylindrical pins 88 to secure them against rotation.

Ducts 90 are used to temperature-regulate the mold parts.

In order to move the radial centering pins 54 into the engaged centering position, an annular tool on collar 92 is provided, illustratively in the form of a bayonet centering device that, depending on its position, either simultaneously forces the centering pins into the centering position or release them, whereby the force of the compression springs 60 compresses them radially outward. The position of the axial centering pins 58, 58' essentially is predetermined.

Each fixed half mold 40 of the molds 30 and 34 includes a casting bush 94 designed to cooperate with a nozzle of the injection unit 8.

FIGS. 2 and 3 each show the molds 30 and 40 in the closed state, wherein the stoppers 36' are injected, ie. shaped in the resultant forming cavities 32 and 36 resp.

After the particular molded article (cap or stopper) has been injection-molded and cooled, the movable mold half 38 is moved away from the fixed mold half 40 towards the left of the drawing and the radial centering pins 54 are withdrawn from their centering positions. The cap 32' then is located by its inside thread 96 on the outside thread 98 of the threading core 48 (FIG. 2) and the stopper 36' is located by its outside thread 100 on the inside thread 102 of the threading sleeve 50 (FIG. 3).

Thereupon the space between the two mold halves 38 and 40 is penetrated by the unscrewing tool 18 equipped with a tool head 103 illustratively clamping a metal strip 104 or also another tool, where this strip or this other tool after the tool head is aligned with the molded article can be moved into the front groove 74 on 74' of this molded article (cap 32' or stopper 36'), and by means of which then due to the rotation of the tool head 103, the molded article can be screwed off or out of the threading sleeve 50 (FIGS. 1 and 4).

As a rule, a multiple array of injection molds and unscrewing tools will be provided.

The unscrewing tool can be rapidly converted to diverse sizes of molded articles by merely exchanging the tool head. The injection molds 30 and 34 can be used with or without cages to manufacture caps and stoppers. When there is no cage, the radial centering pins may remain in their advanced, outer positions.

We claim:

1. Apparaus for injection molding a threaded plastic closure, comprising:
   (a) a longitudinally disposed male mold element fixed on an axis and including integral first means for forming a generally radially directed groove transverse to said axis in an endwall of a closure;
   (b) a female mold element displacable along said axis and cooperating with said male mold element for defining a mold cavity in which the closure is formed when said female element is proximate said male element and for removing the formed closure from the male element when displaced away therefrom and including integral second means for forming threads in a sidewall of the closure; and,
   (c) tool means displacable between a first position spaced from said mold elements and a second position disposed therebetween and including longitudinally extending ejection means comprising strip means positionable in the endwall groove of the formed closure and said ejection means rotatable on said axis for removing the closure from said female element so that the closure may be displaced therewith to said first position.

2. The apparatus of claim 1, further comprising:
   (a) means extending through said male element and communicating with said cavity for supplying a closure forming material to said cavity; and,
   (b) duct means being operably associated with one of said elements for regulating the temperature thereof.

3. The apparatus of claim 1, wherein:
   (a) said male element including a peripherally disposed mold cavity member and a lifting core closing one end thereof;
   (b) said female element including a peripherally disposed threading sleeve and a plate closing one end thereof; and,
   (c) first means securing said mold cavity member to said lifting core and second means securing said threading sleeve to said plate.

4. The apparatus of claim 1, further comprising:
   (a) first and second plate elements disposed in generally parallel arrangement, said first plate element being displaceable toward and away from said second plate element;
   (b) a plurality of female mold elements being mounted to said first plate element and a plurality of male mold element being mounted to said second plate element; and,
   (c) said tool means including a plurality of ejection means, there being one ejector means for each of said female mold element.

5. The apparatus of claim 1, further comprising:
   (a) means being operably associated with one of said mold elements for positioning a reinforcing cage within said mold cavity.

6. The apparatus of claim 5, wherien said positioning means includes:
   (a) first means extending axially from one of said mold elements and into said cavity for axially positioning a reinforcing cage within said cavity.

7. The apparatus of claim 6, further comprising:
   (a) a pluality of axially spaced and peripherally disposed pin means extending from one of said mold elements and into said cavity for radially positioning a reinforcing cage within said cavity.

8. The apparatus of claim 7, wherein:
   (a) spring means being operably associated with each of said pin means for biasing said pin means out of said cavity; and,
   (b) collar means being slidably mounted about said pin means carrying element and engageable with said pin means for forcing said pin means into said cavity when in a first position and for permitting said pin means to be withdrawn by said spring means from said cavity when in a second position.

9. The apparatus of claim 7, wherein:
   (a) each of said pin means including a lateral clearance; and,
   (b) stop means being operably associated with the pin means carrying element and being positionable within said clearances for preventing removal of said pin means from the element.

10. The apparatus of claim 7, wherein:
    (a) said first means extending from said male element.

11. The apparatus of claim 7, wherein:
    (a) said second forming means adapted for forming the threads about the exterior of the closure; and,
    (b) said pin means extending from said female element.

12. The apparatus of claim 7, wherein:
    (a) said second forming means adapted for forming the threads about the interior of the closure; and,
    (b) said pin means extending from said male element.

* * * * *